United States Patent [19]

Nield et al.

[11] Patent Number: 5,464,884

[45] Date of Patent: * Nov. 7, 1995

[54] COATING PROCESS AND CURABLE COMPOSITIONS

[76] Inventors: Eric Nield, Dell Lees, Seer Green, Beaconsfield, HP9 2UJ; Daljit K. Suemul, Abbotts Road, Erdington, Birmingham, B24 8DE; Denis M. H. Bovey, 17 Cippenham Close, Slough, Berkshire, SL1 5BH, all of England

[ * ] Notice: The portion of the term of this patent subsequent to Sep. 7, 2010, has been disclaimed.

[21] Appl. No.: 252,523

[22] Filed: Jun. 1, 1994

Related U.S. Application Data

[60] Continuation of Ser. No. 894,427, Jun. 5, 1992, abandoned, which is a division of Ser. No. 453,299, Dec. 22, 1989, Pat. No. 5,141,779.

[30] Foreign Application Priority Data

Dec. 23, 1988 [GB] United Kingdom ............... 8830071
Jan. 4, 1989 [GB] United Kingdom ............... 8900077

[51] Int. Cl.⁶ ................. C08L 67/02; C08L 63/00; C08K 3/00; C08K 5/00
[52] U.S. Cl. ............... 523/400; 523/402; 523/456; 523/463; 525/438; 525/903
[58] Field of Search ................. 525/438, 903; 523/400, 402, 456, 463

[56] References Cited

U.S. PATENT DOCUMENTS

| | | | |
|---|---|---|---|
| 3,766,109 | 10/1973 | Pratt et al. | 523/440 |
| 3,959,209 | 5/1976 | Lake | 525/43 |
| 3,969,430 | 7/1976 | Kalnin et al. | 525/435 |
| 4,133,916 | 1/1979 | McGinniss et al. | 427/385.5 |
| 4,206,096 | 6/1980 | Takagi | 525/233 |
| 4,246,378 | 1/1981 | Kometani | 525/438 |
| 4,552,932 | 11/1985 | Schollenberger | 525/440 |
| 4,622,368 | 11/1986 | Verbicky, Jr. et al. | 524/401 |
| 4,732,921 | 3/1988 | Hochberg | 525/438 |
| 4,740,580 | 4/1988 | Merck | 525/438 |
| 4,754,001 | 6/1988 | Blahak | 525/903 |
| 4,833,026 | 5/1989 | Kausch | 428/315.5 |
| 4,845,162 | 7/1989 | Schmitt | 525/903 |
| 4,919,992 | 4/1990 | Blundell et al. | 428/131 |
| 5,242,994 | 9/1993 | Nield | 525/438 |
| 5,258,471 | 11/1993 | Nield | 525/438 |

FOREIGN PATENT DOCUMENTS

| | | | |
|---|---|---|---|
| 701110 | 1/1965 | Canada | 427/386 |
| 191224 | 10/1985 | European Pat. Off. | C09D 3/733 |
| 0199846 | 11/1986 | European Pat. Off. | C08J 3/00 |
| 225792 | 6/1987 | European Pat. Off. | C08L 27/18 |
| 1155791 | 6/1969 | United Kingdom | C08F 29/18 |
| 1418701 | 12/1975 | United Kingdom | C07D 241/04 |

OTHER PUBLICATIONS

D. M. Considine (ed.) "Chemical and Process Technology Encyclopedia", McGraw–Hill Book Co., New York, N.Y., pp. 797–798.

Primary Examiner—John C. Bleutge
Assistant Examiner—D. R. Wilson

[57] ABSTRACT

Curable partially plasticised (optionally particulate) compositions comprising partially crystalline polymers which can be made by for example a non-attritive method comprising heating a mixture of the polymer in a preferably moderate curable solvent for the polymer to a temperature above the melting point of the polymer when in the solvent and then cooling whereupon the polymer re-crystallizes from the mixture. Also the use of such compositions in coating and in coating formulation.

6 Claims, No Drawings

COATING PROCESS AND CURABLE COMPOSITIONS

This is a continuation of application Ser. No. 07/894,427, filed on Jun. 5, 1992, which was abandoned upon the filing hereof, which is a division of application Ser. No. 07/453,299, filed Dec. 22, 1989, now U.S. Pat. No. 5,141,779.

This invention relates to coating processes in which a curable composition containing crystallizable polymer is provided on a surface and cured. It also relates to curable compositions containing crystallizable thermoplastic polymers (including copolymers and polymers optionally modified by the presence of additives for example other crystallizable or non-crystallizable polymers or grafted moieties such as those containing carboxylic moieties), to methods for making such compositions and to the use of the compositions in coating processes and formulations.

Crystallizable polymers are well known to include polyesters such as polyethylene terephthalate (PET) or polybutylene terephthalate (PBT) which usually have a density of about 1.4 and 1.3 g/cm$^3$ respectively, polycarbonates, polyamides (often called nylons) and polyolefins, especially low, medium and high density polyethylenes and isotactic polypropylenes. A fuller description of the various types of polyester, polycarbonate or nylon is given in the third edition of Kirk-Othmer's "Encyclopaedia of Chemical Technology" published by John Wiley & Sons of New York in 1982 see Volume 18 pages 549 to 574 pages 479 to 494 or pages 406 to 425 for polyesters, polycarbonates and nylons respectively or Volume 16 pages 402 to 441 or pages 453 to 467 for polyethylenes or polypropylenes respectively. These pages are herein incorporated by reference. Examples of useful polyester copolymers include polyethylene terephthalate, copolymers comprising both terephthalic and isophthalic acid and elastomeric polyesters having segments of a low glass transition temperature. Polyamides also include recently available nylon 4, 6 and so called partially crystalline aromatic nylons. Aromatic nylons are polyamides comprising condensates of aromatic diamines such as 1,3-di-(aminomethyl) benzene. Examples of useful copolymers of ethylene include copolymers of ethylene with up to 30 wt % of other alpha-olefins or olefinically unsaturated carboxylic acids or esters such as vinyl acetate or lower (for example $C_1$ to $C_4$) alkyl acrylates or methacrylates, and especially polyethylenes containing small amounts (for example a trace to up to 1 wt %) of copolymerised or grafted carboxylic acid moiety. Useful propylene copolymers include copolymers comprising up to 15 wt % of ethylene. Polyolefins may be usefully blended with each other or up to 30 wt % of ethylene/propylene (optionally diene modified) rubbers or other rubbers.

Other useful crystallizable polymers include polyvinyl fluorides, polyvinylidene fluorides polyurethanes and polyhydroxy butyrates.

Some of the above crystallizable polymers can aquire a crystalline form merely by solidifying from the molten state whilst some (notably the polycarbonates and some polyesters) are amorphous as supplied but may be easily converted to partially crystalline form by exposure to solvents. It is for this reason that the polymers are herein described generically as "crystallizable" rather than "crystalline".

In general crystallizable thermoplastic polymers have many properties such as toughness, hardness, abrasion resistance and flexibility which make them useful as coating materials whereas conventional cured coatings can have advantages such as corrosion and solvent resistance and good adhesion to substrates. However, so far attempts to incorporate crystallizable thermoplastic polymers into cured coatings have led to highly inhomogenous structures which because of their inhomogeneity have shown only minimal improvements in the overall properties of the cured coating. An object of this invention is to provide a coating process which allows the production of cured coatings containing a more uniform distribution of crystallizable thermoplastic polymer with consequent improvement of properties.

This invention provides a coating process in which a curable composition containing crystallizable polymer is provided on a surface and subsequently cured to produce a cured coating on the surface wherein the process comprises a) making a curable composition comprising the crystallizable polymer and curable non-permanent solvent system by alternatively
   i) forming a solution of the polymer and non-permanent curable solvent system from which either solid/liquid phase separation of crystallizable polymer can occur on cooling and/or solid/solid phase separation of crystallizable polymer can occur on curing of the solvent system or
   ii) forming a solution of the polymer and non-permanent curable solvent system at an elevated temperature and cooling the solution so obtained to cause solid/liquid phase separation of crystallizable polymer or
   iii) forming a solution of the polymer and non-permanent non-curable solvent system at an elevated temperature, cooling the solution so obtained to cause solid/liquid separation of polymer, removing the solvent from the polymer and adding the polymer to the non-permanent curable solvent system at a temperature at which non-permanent solvent system becomes entrapped in the polymer which curable composition when made as in (i) or (ii) may be made in situ on the surface or away from the surface or which when made as in (iii) is made away from the surface b) where and when necessary, introducing a curing agent reactable with the curable solvent system so as to be able to cure the system, c) where the curable composition is made away from the surface, applying the curable composition to the surface and d) subjecting the curable composition to conditions under which the solvent system cures to form the cured coating whereby a cured coating is obtained which at ambient temperature is enhanced by the presence of crystallizable polymer. A "non-permanent" solvent system for a crystallizable polymer is a solvent system which is able to dissolve the polymer usually at elevated temperatures, that is to say temperatures above (and preferably at least 40° C. above) ambient but which allows solid/liquid phase separation of crystallizable polymer from the solvent to occur either 1) on cooling at rates of less than 100° C./min or 2) on curing in those cases where the non-permanent solvent is curable.

Therefore the use of a non-permanent solvent means that at ambient temperature and/or in the cured system the polymer exists as a solid dispersed in the system. Ambient temperatures are usually from 10° to 30° C. A solution may comprise polymer dissolved solvent system or solvent system dissolved in polymer.

Where the curable composition is obtained by dissolving crystallizable polymer in non-permanent curable solvent system at elevated temperatures, the composition may be made either in situ on the surface by applying to the surface a dispersion of the polymer in the solvent system and then heating to dissolve the polymer or alternatively it may be made away from the surface and then applied to the surface usually as a hot solution. In addition, it is sometimes possible to obtain metastable solutions of polymer in non-permanent solvent system by shock-cooling at a cooling rate of at least 100° C./min and preferably at least 300° C./min. Such metastable solutions may offer the opportunity to apply the composition at temperatures lower than those needed to dissolve the polymer (particularly ambient) so reducing the risk of premature curing of heat-curable solvent systems or of thermal degradation of the polymer. If solid polymer can be caused to separate from the solvent system by curing the system, then cold metastable solutions may also be applied to the surface.

Most solutions of polymer in curable solvent systems are highly viscous at practicable concentrations of polymer and so are less easily provided on surfaces, especially surfaces which are not smooth or flat.

Therefore it is preferred to employ compositions which comprise a dispersion in curable solvent system of solid crystallizable polymer comprising amorphous zones containing entrapped curable solvent system. If the polymer is required to dissolve or soften during performance of the process, it is preferred that the polymer be in the form of dispersed particles having a number average maximum diameter of less than 500 μm (and preferably less than 30 μm, 1 μm being $10^{-6}$ m). Such particles not only facilitate dissolution but also offer an alternative to complete dissolution of the polymer by the use of conditions (primarily less high temperatures and/or higher concentrations) which cause the particles to soften rather than dissolve. By "soften" it is meant that the particles become less hard than they would be in the absence of solvent system at ambient temperature and preferably soft enough to enable contiguous particles to coalesce. Softening is probably assisted by plasticisation by the entrapped solvent system. The use of softened particles as an alternative to dissolution reduces the risk of premature curing of heat-curable solvent systems and/or of thermal degradation of the polymer.

Curable compositions provided on a surface may be heated to form a solution of the polymer and the curable solvent. Alternatively, if the composition comprises particles, it may be heated to soften particles of the polymer. Heating increased the ability of the polymer to flow which in turn gives coatings having better mechanical properties and improved appearance, particularly better gloss and/or smoothness. Curing may be initiated whilst the polymer is still in a solution or softened state or alternatively the composition may be cooled towards (preferably to) ambient temperature before any substantial curing is positively initiated. Curing will then occur in the presence of solid polymer and will have the effect of linking together adjacent amorphous zones of crystallizable polymer which generally improves homogeneity. Curing also similarly links together amorphous zones of polymer particles which have not been heated after they have been provided on the surface to be coated.

Accordingly this invention provides either as a new starting material or as a new intermediate in the coating process a curable composition comprising (optionally particles of) crystallizable polymer comprising amorphous zones containing entrapped curable solvent system whereby adjacent zones may be linked together by curing of the entrapped system.

A practical difficulty concerning the use of particles of crystallizable thermoplastic polymers arises from the fact that many processes for their commercial manufacture produce pellets which have a maximum dimension of not less than 2 mm which means that the pellets need to be converted into distinct fine particles, that is to say particles having a maximum dimension of below 500 μm. Hitherto this has been done by attritive methods such as grinding or milling. However attritive methods produce particles of an unpredictable shape which are inconvenient to use in coating processes. It is therefore another object of this invention to provide a non-attritive process for making particles of crystallizable thermoplastic polymer containing entrapped curable solvent system and especially particles having a maximum dimension of below 500 μm.

Accordingly this invention provides a non-attritive method for making particles from crystallizable thermoplastic polymer which comprises a) heating a mixture comprising a curable moderate (as hereinafter defined) solvent system and at least 5 (preferably 10 to 50) wt % of the polymer (the percentage being based on the combined weights of the moderate solvent and the polymer) to a temperature above the crystalline melting point ($T_m$) of the polymer when in the mixture and preferably to a temperature in the range $T_m+10°$ C. to $T_m+80°$ C. and b) cooling the heated mixture (preferably to below $T_m$) to cause separation preferably under conditions such that solid/liquid phase separation occurs whereby particles of crystallizable polymer are obtained which comprise crystalline zones and amorphous zones containing entrapped curable solvent system. In a modification of the non-attritive method, a non-curable moderate solvent system is used instead of the curable solvent system with the result that the particles obtained have amorphous zones containing entrapped non-curable solvent system which is then replaced by curable solvent system by removing the non-curable system from the particles, adding the particles to curable solvent system and subjecting the particles and system to a temperature at which the particles imbibe and entrap curable solvent system. This modified method has the advantage of allowing particles to be made using non-curable solvents so avoiding any risk of premature curing during the heating which is necessary to form the solution. Non-curable solvents are also usually much cheaper. Any non-permanent solvent system may be conveniently removed from the particles by first decanting off any free liquid solvent system and then washing the particles with a non-solvent for the polymer which is miscible with the non-curable solvent system. A "non-solvent" is a liquid which has no significant dissolving effect on the polymer at the washing temperature.

Particles obtained from the non-attritive method may sometimes be agglomerated. Where distinct particles are required, the agglomerate will need to be subjected to a shearing operation. A shearing operation differs from an attritive operation in that shearing merely separates particles which have already been formed whereas attrition forms particles by fracturing polymer. Often shearing can be achieved by forces no greater than those exertable between finger and thumb.

The non-attritive methods employ a moderate solvent system. In those cases where the solvent system does not react chemically with the polymer, "moderate" can be defined as meaning a solvent system which when used to make a mixture consisting of the solvent system and 20 wt % of the crystallizable polymer a) is able to form a solution of the polymer and solvent system when the mixture is heated to above the crystalline melting point $T_m$ of the polymer when in the mixture and the mixture is maintained at above $T_m$ for 5 minutes and b) allows a solid/liquid separation and re-crystallization of the polymer to give distinct particles of polymer when the mixture is cooled to a temperature below $T_m$ and preferably at least 30° C. below $T_m$.

For the purposes of the above definition insofar as it relates to polyesters and polyamides, both the solvent system and the polymer should be dry. A "dry solvent contains less than 0.005 wt % of water for polyesters and less than 0.05 wt % for polyamides and a "dry" polymer is a polymer which has been heated in a vacuum oven for 16 h at 90° C. Crystalline melting point is determined by differential scanning calorimetry performed in turn on the polymer alone and on the above mixture. The mixture must be contained in a sealed capsule to prevent loss of the moderate solvent during heating. More particularly, 10 mg of polymer alone and 10 mg of mixture are each in turn subjected to cycles of heating and cooling performed under nitrogen in the calorimeter. Each heating/cooling cycle comprises heating the sample under test, (which may be polymer alone or a mixture) at a rate of 20° C./min to cause crystalline melting which occurs at a temperature $T_m$, subsequently holding the sample for two minutes at a holding temperature $T_h$ which is above $T_m$, then cooling at a rate of 20° C./min to cause recrystallization which occurs at a temperature $T_c$ and finally continuing cooling to a temperature of at least 10° C. below $T_c$. $T_m$ and $T_c$ are detected respectively as an endothermic trough and an exothermic peak in the graph of heat absorbed or evolved versus temperature. Each cycle is repeated to discover whether a consistent value of $T_c$ can be obtained. If consistency is not obtained, another pair of heating/cooling cycles are performed using a slightly higher $T_h$. Further pairs of cycles with gradually increasing $T_h$ are performed until consistent values for $T_c$ are achieved whereupon the pair of cycles which gave consistent values is repeated and the value for $T_m$ obtained is defined to be the crystalline melting point of the sample under test.

More particularly for polyesters, polycarbonates polyamides and polyolefins a preferred moderate solvent system is a system which depresses the crystalline melting point $T_m$ of the polymer by not more than 80° C. when the polymer constitutes 20 wt % of a mixture of dry moderate solvent system and dry polymer. Good solvents (for example orthochlorophenol for PET or phenol for nylon for depress $T_m$ by well in excess of 80° C.

Examples of curable moderate solvent systems (especially those suitable for use with polyesters) include epoxy ethers based on various glycidyl derivatives and in particular derivatives of bisphenol A available from Shell Chemicals Limited as "Epikotes". Such epoxy ethers have the general formula

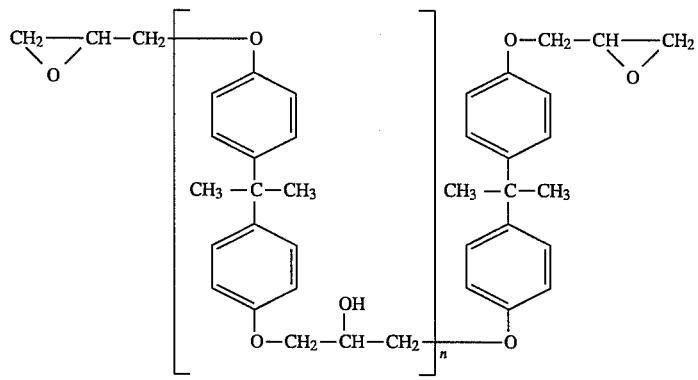

where n is preferably from 0 to 9 and may be non-integral, eg, 1.2. Other useful epoxy compounds include glycidyl derivatives of the following namely, bis(4-hydroxy phenyl) methane, terephthalic acid, isocyanurate, sorbitol and Novolac resins which are polyphenol formaldehyde. The curable epoxy compounds need to be used in combination with curing agents which bring about curing when heated. Suitable curing agents include dodecanoic acid, phthalic anhydride, diaminodiphenylsulphone, dicyandiamide, triethylene tetramine, 1,6 hexamethylene diamine and melamine or urea formaldehydes. The curable Novalac resins are particularly suitable for use with both polyesters and polyamides and need to be used in combination with curing agents such as hexamine and hexamethoxymethylmelamine. Polyamides may also be used with curable solvent systems such as glycerol or triethylene glycol which cure by reacting with curing agents such as formaldehyde resins.

Unsaturated compounds such as long chain fatty acids (especially linseed oil) and dienes such as dicyclopentadiene may be used as moderate curable solvent systems particularly with polyolefins. These cure by autoxidation preferably in the presence of catalysts such as cobalt octoate or naphthenate and accordingly no added curing agent is needed since atmospheric oxygen will permeate the composition.

The curable solvent system may consist solely of a curable compound which is itself a non-permanent solvent for the polymer. Alternatively it may comprise a curable compound present as a single phase mixture with a non-curable solvent in which case the curable compound need not necessarily be a solvent for the crystallizable polymer or it may be a poor solvent in which case the non-curable solvent may be regarded as an auxiliary solvent. For example the single phase mixture may be a solution of curable compound in non-curable solvent or a mixture of two miscible liquids one of which is the curable compound and one of which is non-curable solvent. Any non-curable solvent either should be tolerable in the cured coating (perhaps serving as a plasticiser) or should be sufficiently volatile to be removable from the coating composition after the composition has been provided on the surface being coated.

It is essential when performing the non-attritive method for making particles of partially crystalline polymers that the mixture be heated to above the melting point ($T_m$) of the polymer when in the mixture for otherwise there will be obtained particles of unpredictable shape comprising some undissolved polymer. Preferably the mixture should be heated at least to its clearing temperature "$T_{cl}$". The "clearing temperature" ($T_{cl}$) of any chosen mixture comprising moderate solvent system and polymer is the temperature at which the appearance of the mixture becomes clear to the unaided eye. $T_{cl}$ is determined by heating 2 g of a chosen mixture until the polymer dissolves and the initially turbid solution obtained turns clear for a first time, then cooling the mixture to room temperature an finally re-heating the mixture until it turns clear for the second time. The temperature at which it turns clear for the second time is defined to be the clearing temperature ($T_{cl}$) for that mixture. Heating to $T_{cl}$ and above (preferably to 10° to 30° C. above $T_{cl}$) leads to the formation of more uniform particle sizes. Uniformity of particle size is also enhanced by heating the mixture to a holding temperature $T_h$ which is above $T_m$ for the polymer when in the mixture (and preferably 10° to 40° C. or even 60° C. above) and holding the mixture at temperature $T_h$ for from 1 to 60 minutes although holding for 1 to 5 minutes is usually sufficient.

It has been found that some large pellets of polymer available commercially can be inconveniently slow to dissolve. Where time saving is important, this problem can be alleviated by using a pre-heating and pre-cooling cycle as follows. The mixture is first pre-heated to a temperature well above (for example 60° C. above) the melting point of the pure polymer. Such pre-heating causes a rapid dissolution of the polymer. The mixture is then pre-cooled to at least a temperature at which the polymer re-solidifies from the mixture. For example the polymer is cooled to at least 30° to 80° C. below the melting point of the pure polymer. Such re-solidification produces polymer in a form which dissolves quickly (usually within 2 minutes) on heating to $T_m$ or above so producing a mixture consisting of a solution of polymer in solvent system which appears clear to the unaided eye.

Also in performing the non-attritive method, it is essential to employ conditions which cause solid/liquid phase separation to occur from the mixture of dissolved polymer and solvent system for otherwise a formless mass may be obtained. To achieve solid/liquid phase separation, it is necessary to use a moderate solvent system, to use a mixture containing at least 5 wt % of polymer and to avoid shock cooling which usually means cooling at a rate of no faster than 300° C./min and preferably no faster than 100° C./min.

The size of the polymer particles can be adjusted by varying the cooling rates employed or by incorporating nucleating agents into the polymer. The nucleating agent chosen should not react with the solvent system. In general higher cooling rates and also nucleating agents favour smaller particles sizes. Typical nucleating agents for polyesters include talc, sodium benzoate or the ionomeric copolymers of ethylene with minor amounts of carboxylate comonomers, for example those known as "Surlyn" A available from EI Dupont de Nemours Inc. Typical nucleating agents for nylons include talc, fluorspar and those disclosed in British patent specification GB 1 465 046 the contents of which are herein incorporated by reference. Typical nucleating agents for polyolefins include talc, sodium benzoate or dibenzylidene sorbitol and its alkyl analogues.

This invention also provides a partially attritive method for making particles of crystallizable polymer for use in a coating process according to this invention. The partially attritive method is a modification of the non-attritive method wherein a) any non-permanent solvent system may be used,
b) the amount of polymer in the mixture is from 50 to 90 wt % (and preferably from 60 to 80 wt %),
c) the solvent system is chosen so as to cause solid/liquid phase separation of the polymer as a mass comprising amorphous zones containing entrapped solvent system,
d) the mass is ground into particles and
e) where the solvent is non-curable it is removed from the ground particles and the particles are added to curable solvent system.

The partially attritive method produces less uniform particles than the wholly non-attritive method but has the advantage of giving a greater yield of particles than a method employing mixtures containing lower concentrations of polymer.

It has further been discovered that a partially attritive method can be performed with any solvents or preferably curable solvent systems which dissolve from 5 to 90 wt % of the polymer at elevated temperatures and which solidify at lower temperatures (preferably ambient) so as to produce a solid mass of solvent system containing crystalline polymer dispersed as particles or as a solid solution or alloy. The solid mass is then ground into particles. Such solidifiable solvent systems may comprise a solvent which by itself is solid at ambient temperatures or which is caused to be solid at ambient temperatures by the presence of the polymer. Generally the solidified solvent system is more brittle than the crystallizable polymer alone and so the polymer is in contact with a more brittle material which makes the polymer more easily fracturable during grinding. Accordingly this invention further provides a modified partially attritive method for making particles of crystallizable polymer for use in a coating process according to this invention wherein a) there is used a curable solvent system which is able to dissolve the polymer at elevated temperature and which solidifies at lower temperatures so producing a solid mass of solvent system containing dispersed polymer,
b) the solid mass is ground into particles and
c) where the solvent system is non-curable, it is removed from the particles and the particles are added to curable solvent system.

The crystallizable polymer may be mixed with the solvent system simply by adding the polymer to the system and then heating and stirring. However a convenient way to mix polymer and solvent system at elevated temperatures comprises feeding both polymer and solvent system to a closed shearing mixer and heating within the mixer to dissolve the polymer. The solution can then be delivered directly to the surface to be coated. The solution may be cooled in or out of the mixer to cause particles to form which can be subsequently applied to the surface. The preferred mixer is an extruder and the extrudate solution may be applied directly to a surface or cooled to form particles. Mixing in an extruder is particularly useful in performing the heating steps in the non-attritive processes for making particles containing entrapped solvent. Extruders offer good control of temperature and so heating can be performed with minimal risk of premature curing of heat-curable solvent systems.

A shearing mixer can also be used to promote the grafting of suitably reactive moieties onto the crystallizable polymer and in particular suitably reactive curable solvent systems may be so grafted with consequent improvements in compatibility between crystallizable polymer and cured coating.

Returning to the coating process according to this invention, the curable composition is eventually subjected to conditions under which the solvent system cures to form the cured coating. Conventional curing techniques are employed. For example a heat-curable composition may be transferred to an oven heated to the preferred temperatures for curing. An autoxidisable composition may be allowed to stand in air. Other compositions may be exposed to curing vapours or liquids.

Usually the weight ratio of crystallizable polymer to curable compound in the composition provided on the surface is from 1:0.1 to 19. Towards the higher ratios of polymer to compound (often at ratios of above 1:4 especially 1:3 and above, the polymer may not always dissolve completely during coating but instead it becomes a mass (usually a paste) of polymer particles softened by solvent system which later cohere for example if the composition is heated to a temperature at which softening or dissolution begins to take place. Most preferably such heating will be to a temperature which is above the temperature $(T_m)$ at which crystalline melting occurs in that composition. The composition will generally be held at these elevated temperatures for from 2 to 45 minutes.

It has been found that when the weight ratio of crystallizable polymer to curable compound is from 1:0.25 to 4, the cured coating usually comprises a network of cohering portions of crystallizable polymer interpenetrated by a network of cohering portions of cured compound. Where the amount of cured polymer is greater than 1:4, the tendency is for the cured coating to comprise a homogenous dispersion of particles of crystllizable polymer in and cohering to cured compound and vice versa if the amount of cured polymer is less than 1:0.25. Interpenetrating networks confer optimum combinations of the properties of crystallizable polymers and cured resins. In particular they increase the ability of surfaces coated with cured resins to undergo shaping operations.

The compositions may be applied to surfaces by a wide variety of conventional techniques such as doctor bar coating, roller coating, spray coating, extrusion coating, brushing and dip coating. Particles may be applied as a dispersion in curable solvent system. Where the particles comprise amorphous zones containing entrapped curable solvent system, they may contain enough entrapped solvent to render the presence of further solvent unnecessary in which case they may be applied as a free flowing powder or as a paste or as a paste or dispersion comprising a non-solvent carrier liquid. The compositions may be applied to opposed surfaces in which case they serve as adhesives.

The surfaces coated according to this invention may be metallic for example aluminium, stainless steel or non-metallic, for example glass, wood, paper or textile. In particular the particles may be used to coat sheets (especially sheets which are to be used in shaping processes), and shaped articles such as cans. The compositions may be used to impregnate continuous rovings of a wide variety of fibres including glass and carbon fibres by application to the surface of the fibres. The impregnated fibres, may be shaped druing curing to produce a composite which on cooling comprises fibre consolidated in cured solvent. The compositions can be used as adhesives to provide laminates and especially laminates for use in shaping processes.

It also has been found that the particles of crystallizable polymer comprising amorphous zones containing curable solvent disperse well in coating compositions (for example paints and varnishes) based on water or organic solvents. Accordingly this invention provides a coating composition (which may be based on an organic solvent or water) comprising a binder of a type used in coating compositions and particles of polymer wherein the particles of polymer comprise zones of amorphous polymer which contain the entrapped curable moderate solvent. The binder may be a curable resin which is co-curable with the solvent system. Typical binders for coating compositions are described in the third edition of the book "Introduction to Paint Chemistry and Principles of Paint Technology" by G P A Turner and published by Chapman and Hall of London in 1988, the contents of which are herein incorporated by reference. The coating composition may also comprise pigments and extenders and other conventional ingredients described in the above book.

Crystallizable polymer (preferably in particulate form) comprising amorphous zones containing entrapped curable solvent system may also be used in a wide variety of thermoforming operations such as extrusion, compression or injection moulding provided that conditions are chosen so as to avoid premature curing of the entrapped solvent.

The invention is further illustrated by the following Examples in which the following tests are employed:

The Rubbing Test:

In the Rubbing Test, each coating was rubbed back and forth with a lambswool cloth soaked in methyl ethyl ketone. After a number of back and forth rubs, the coated surface became visible through the coating when viewed through an optical microscope at ten fold magnification. The number of back and forth rubs needed for this to happen is recorded.

The Chisel Test:

In the Chisel Test, the apex of an isoceles triangular blade was stood on the coating with the blade touching the coating and subtending an angle of 45° C. thereto. The base of the triangle was 6.1 mm long and the distance from the base to the apex was also 6.1 mm. The chisel was loaded with a weight and then drawn once across the coating in a direction parallel to the 300 mm edge of the sheet. The loading weight was increased until the apex of the blade caused the aluminium surface to become visible through the coating when viewed through an optical microscope at ten fold magnification. The loading needed for this to happen is recorded.

The "T" Bend Test:

The "T" Bend Test is performed according to the procedure of ASTM Test D 4145-83 the contents of which are herein incorporated by reference.

The Corrosion Test:

The Acetic Acid-salt Spray Corrosion Test is performed according to the procedure of ASTM Test B 287-74 the contents of which are herein incorporated by reference.

The Reverse Impact Test:

The Reverse Impact Test is performed according to the procedure of ASTM Test D 4145-83 ("Resistance of Organic Coatings to the Effects of Rapid Deformation") the contents of which are herein incorporated by reference.

Also in the Examples coatings are applied to flat smooth sheets using a Meyer doctoring bar which comprises a cylindrical metal bar of diameter 9 mm around which is helically wound a single layer of a wire of diameter 0.8 mm with its adjacent helices contiguous throughout their length. In this way the bar is provided with a series of circumferential parallel grooves each 400 μm deep. To apply a coating, the bar sheet and the curvature of the bar combine to define a nip into which the composition to be applied is delivered. The bar is then drawn across the sheet leaving a trail of parallel ridges of the composition initially 400 μm high.

EXAMPLES 1 TO 20

Making and Use of Curable Compositions Containing Polyester Particles 10 g samples of various polyesters specified in Table 1 were each mixed with a curable epoxy moderate solvent system which was "Epikote" 880 (which is bisphenol A diglycidyl ether) in amounts also specified in Table 1. Each mixture was heated to a temperature which was above the crystalline melting point $T_m$ of the polyester when in the mixture and also 50° C. above the clearing temperature $T_{cl}$ of the mixture so as to dissolve the polyester whereupon the mixture existed as a clear solution. $T_{cl}$ for each mixture is given in Table 1. The mixture was held at this temperature for 2 minutes and then cooled to a temperature 50° C. below $T_{cl}$. A solid/liquid phase separation and re-crystallization occurred. The heating and cooling cycle was repeated three times except that the third cooling was allowed to proceed to room temperature thereby producing fine, distinct and approximately spherical partially plasticised particles comprising crystalline zones

TABLE 1

| Eg | Polymer | Amount Polymer in Mixture, wt % | $T_{cl}$ °C. | Typical Particle Dimension μm |
|---|---|---|---|---|
| 1 | PET | 10 | 195–200 | 10 |
| 2 | PET | 20 | " | " |
| 3 | PET | 30 | " | " |
| 4 | PET | 40 | 200 | " |
| 5 | PBT | 10 | 170 | 5–10 |
| 6 | PBT | 20 | 170 | " |
| 7 | PBT | 30 | 170 | " |
| 8 | PBT | 40 | 170 | " |
| 9 | PET/I | 10 | 135–140 | " |
| 10 | PET/I | 20 | " | 5–10 |
| 11 | PET/I | 30 | " | " |
| 12 | PET/I | 40 | " | " |
| 13 | Hytrel 4056 | 10 | 95–100 | 2–5 |
| 14 | Hytrel 4056 | 20 | " | " |
| 15 | Hytrel 4056 | 30 | " | " |
| 16 | Hytrel 4056 | 40 | " | " |
| 17 | Hytrel 7246 | 10 | 195–200 | 2–5 |
| 18 | Hytrel 7246 | 20 | " | " |
| 19 | Hytrel 7246 | 30 | " | " |
| 20 | Hytrel 7246 | 40 | " | " | and amorphous zones containing imbibed curable epoxy solvent system. A typical dimension of the particles as determined by optical microscopy is shown in Table 1. The particles comprised about 50 wt % of entrapped reactive solvent and were obtained as a paste consisting of particles and moderate solvent. 10 g of each of the above pastes were in turn introduced to curing agent by thoroughly mixing with (as shown in Table 2) the curing agent which was diaminodiphenylsulphone. The weight of curing agent used was equal to half the weight of "Epilote" 880 used. Each paste in turn was then applied to a flat smooth aluminium sheet 300 mm long by 100 mm wide using a Meyer doctoring plate. Next the sheets were heated in an oven for 45 minutes and at a temperature in the case of Examples 5 to 16 of 200° C. and in the case of Examples 1 to 4 and 17 to 20 of 230° C. The sheets were then allowed to cool to room temperature whereupon they were found to carry a smooth glossy tenacious coating of cured synthetic material. These coatings were then subjected to the rubbing and chisel tests and the results are shown in Table 2.

The pastes obtained could be converted to dry free flowing particles by rinsing with acetone to remove moderate solvent system external of the particles.

In Table 1 the polymers used were as follows: The PET had an intrinsic viscosity of 0.64 to 0.66 cm³/g in orthochlorophenol at 25° C. The PBT was "Celanex" 2002-2 from the Celanese Company. PET/I is a PET copolymer containing 18 wt % isophthalate. "Hytrels" are available from EI DuPont de Nemours.

TABLE 2

| Example | Wt of Curing Agent g | No. of rubs to expose metal | Chisel load to expose metal g |
|---|---|---|---|
| 1 | 3.0 | >100 | 400 |
| 2 | 2.6 | >100 | 500 |
| 3 | 2.3 | >100 | 300 |
| 4 | 2.0 | >100 | 300 |
| 5 | 3.0 | >100 | 200 |
| 6 | 2.6 | >100 | 100 |
| 7 | 2.3 | >100 | 200 |
| 8 | 2.0 | >100 | 200 |
| 9 | 3.0 | >100 | 300 |
| 10 | 2.6 | >100 | 200 |
| 11 | 2.3 | >100 | 200 |
| 12 | 2.0 | >100 | 300 |
| 13 | 3.0 | >100 | 200 |
| 14 | 2.6 | >100 | 100 |
| 15 | 2.3 | 52 | >100 |
| 16 | 2.0 | 6 | 200 |
| 17 | 3.0 | >100 | 400 |
| 18 | 2.6 | >100 | 300 |
| 19 | 2.3 | >100 | 300 |
| 20 | 2.0 | >100 | 300 |

EXAAMPLE 21

Making and Use of Curable Composition Containing Polyamide Particles 3 g of a nylon 6 polyamide available as "Maranyl" B3 from Imperial Chemical Industries PLC was mixed with 5 g of a curable moderate solvent system which was a novalac phenolic resin having a melting point 108° C. and available from Schenectady Midland Chemicals Ltd and with 5 g of benzyl alcohol as auxiliary solvent. The mixture was heated to a temperature of 200° C. which was above the crystalline melting point $T_m$ of the nylon when in the mixture and also above its clearing temperature $T_{cl}$ so as to dissolve the nylon whereupon the mixture existed as a solution. The mixture was held at 200° C. for 2 minutes and then cooled to 120° C. The mixture was heated to 200° C. for a second time and then allowed to cool to 50° C. Finally the mixture was heated to 200° C. for a third time and then allowed to cool to room temperature and stood in iced water for 5 minutes whereupon a solid/liquid phase separation and re-crystallization occurred producing fine, distinct and approximately spherical partially plasticised particles comprising crystalline zones and amorphous zones containing entrapped solvent system. A typical dimension of the particles as determined by optical microscope was from 10 to 15 μm. The particles comprised about 50 wt % of entrapped solvent system and were obtained as a paste consisting of particles and moderate solvent system.

The pastes obtained could be converted to dry free flowing particles by rinsing with acetone to remove solvent system external of the particles. Rinsing amounted to placing the paste on filter paper in a funnel and pouring acetone through for 30 seconds at room temperature. The pastes were also suitable for mixing with hexamethoxymethyl melamine to produce a curable composition which could be cured in a hot oven to give smooth glossy tenacious coherent coatings on aluminium.

EXAMPLES 22 AND 23

Making and Use of Curable Compositions Containing Polyethylene Particles

High density polyethylene available from BP Chemicals Ltd as "Rigidex" HM 5590 EA was mixed with a curable moderate solvent system which was linseed oil in amounts as specified in Table 3. 10 g of each mixture was subjected to a double pre-heating/pre-cooling cycle and then heated to a temperature above the crystalline melting point of the polyethylene when in the linseed oil and also above the clearing temperature for the mixture. The mixture was finally allowed to cool to room temperature. The temperatures reached in these heating cycles are given in Table 4. Heating caused the polyethylene to dissolve whereupon the mixture existed as a solution. At least the last cooling caused a solid/liquid phase separation and re-crystallization which produced fine, distinct and partially plasticised particles comprising crystalline zones

TABLE 3

| Eg | Amount PE in Mixture, wt % | Typical Particle Dimension μm |
|---|---|---|
| 22 | 10 | 2–6 |
| 23 | 30 | 2–6 |

TABLE 4

| | HEATING CYCLES | | | | |
|---|---|---|---|---|---|
| Amount PE wt % | 1st Pre-Heat to °C. | Cool to °C. | 2nd Pre-heat to °C. | Cool to °C. | Heat to °C. |
| 10 | 220 | 52 | 210 | 60 | 210 |
| 30 | 220 | 60 | 220 | 70 | 210 | and amorphous zones containing entrapped linseed oil. The particles were either spherical or oblate having a typical maximum dimension as determined by optical microscope as shown in Table 3. The particles comprised about 50 wt % of imbibed linseed oil and were obtained as a paste consisting of particles and linseed oil.

The pastes obtained can be mixed with a conventional amount of cobalt naphthenate to produce a curable composition suitable for curing in a hot oven to give smooth glossy tenacious coherent coatings on aluminium.

EXAMPLES 24 TO 27

Making and Use of Curable Compositions Containing Polypropylene Particles 10 g samples of a polypropylene (PP) were each mixed with a curable moderate solvent in amounts as specified in Table 5. The polypropylene was available from Imperial Chemical Industries PLC as "Propathene" GWE 26 and had a melt flow index of 3 as determined by BS 2782720A using a 2.16 kg load at 230° C. Each mixture was subjected to a double pre-heating/pre-cooling cycle and then heated to a temperature above the crystalline melting point of the polymer when in the solvent system and also above the clearing temperature for the mixture. The mixture was finally allowed to cool to room temperature. The temperatures reached in these heating cycles are given in Table 6. Heating caused the polymer to dissolve whereupon the mixture existed as a solution. At least the last cooling caused a solid/liquid phase separation and re-crystallization which produced fine, distinct and approximately spherical partially plasticised particles comprising crystalline zones and amorphous zones containing

TABLE 5

| Eg | Solvent | Amount Polymer in Mixture, wt % | Typical particle size μm |
|---|---|---|---|
| 24 | Linseed oil | 10 | 6–10 |
| 25 | " | 30 | 6–10 |
| 26 | Dicyclopentadiene | 10 | 12 |
| 27 | " | 30 | 12 to 15 |

TABLE 6

| | HEATING CYCLES | | | | |
|---|---|---|---|---|---|
| Eg | 1st Pre-Heat to °C. | Cool to °C. | 2nd Pre-heat to °C. | Cool to °C. | Heat to °C. |
| 24 | 225 | RT | 230 | 78 | 210 |
| 25 | 220 | RT | 230 | 72 | 210 |
| 26 | 180 | 50 | 180 | 78 | 182 |
| 27 | 180 | 52 | 180 | 70 | 180 |

RT means room temperature.

entrapped curable solvent system. The particles comprised about 50 wt % of entrapped solvent system and were obtained as a paste consisting of particles and solvent system. Typical particle sizes obtained as determined by optical microscopy are shown in Table 5. The particles were mixed with cobalt naphthenate to produce a curable composition which was suitable for curing in an oven to produce smooth glossy tenacious coherent coatings on aluminium.

EXAMPLE 28

Making and Use of Curable Compositions Containing Polyester and Curable Oligomeric Solvent System 2.2 g of PBT (available as "Valox" 310) was mixed with a curable oligomeric moderate solvent system which was 22 g of an oligomeric curable compound which was a condensate of a mixture of terephthalic acid, isophthalic acid, adipic acid trimethylylol propane and neopentaglycol in the molar ratios of 0.51:0.09:0.4:0.12:0.98 having an weight average molecular weight of about 1900.

The mixture was heated to 220° C., allowed to cool to 25° C. and then re-heated to 240° C. and allowed to cool to 100° C. whereupon re-crystallization occurred. At 100° C., the mixture was diluted by the addition of an equal weight of an auxiliary solvent which was a 1:1 mixture of "Solvesso" 150 and methyl propoxol acetate. ("Solvesso" 150 is a mixture of aromatic $C_9$ and $C_{10}$ hydrocarbons having a boiling point range of 190° to 210° C. at 1 bar). The mixture then cooled to room temperature.

A curing agent system consisting of 1.85 g of hexamethoxymethyl melamine and 0.14 g of a sulphonic acid available as "Nacure" XP 253 was added to 23.35 g of the above mixture and the whole stirred. The stirred mixture was then applied to a smooth aluminium sheet using the Meyer doctoring bar and heated in an oven for 60 secs at a peak temperature of 232° C. A smooth glossy tenacious coherent cured coating was obtained on the aluminium.

EXAMPLE 29

Making and Use of Curable Compositions Containing Polyester Elastomer and Curable Non-solvent A mixture of 72.3 g polyester curable elastomer available as "Hytrel" 4056 and 108.5 g of the oligomer used in Example 28 was heated to 220° C., held for 10 minutes at 220° C., then allowed to cool to 200° C. and then 69.7 g of auxiliary solvent which was "Solvesso" 150 was added. The mixture was next allowed to cool to 150° C. when 50.8 g of a second auxiliary solvent which was methyl propoxol acetate was added. The mixture was allowed to cool to 50° C. and then re-heated to 90° C. and 100 g of a 1:1 mixture of "Solvesso" 150 and methyl propoxol acetate was added. The mixture was finally allowed to cool to room temperature during which cooling re-crystallization occurred.

50 g of the re-crystallized mixture was stirred with 2.126 g of hexamethoxymethyl melamine curing agent, 0.28 g of the sulphonic acid curing agent used in Example 28 and a further 25 g of "Solvesso" 150 to produce a curable composition, The composition was applied to a smooth flat aluminium sheet as in Example 28 and heated in an oven for 60 seconds to a peak temperature of 232° C. A smooth glossy tenacious coherent cured coating was obtained on the aluminium sheet.

EXAMPLES 30 TO 35 AND COMPARATIVE EXAMPLE A

Effect of Varying the Polyester Content of Curable Compositions

PBT similiar to that used in Examples 5 to 8 but supplied by ATO Chemie as "Orgator" TMNO was mixed with a moderate curable solvent system which was "Epikote" 880 bisphenol A diglycidyl ether to give mixtures containing amounts of PBT as specified in Table 7. Each mixture was heated to a temperature which was above the crystalline melting point $T_m$ of the polyester when in the mixture and also 50° C. above the clearing temperature $T_{cl}$ of the mixture so as to dissolve the polyester whereupon the mixture existed as a clear solution. $T_{cl}$ for each mixture is given in Table 7. The mixture was held at this temperature for 20 to 40 minutes and then cooled to a temperature 50° C. below $T_{cl}$. A solid/liquid phase separation phase separation occurred. The heating and cooling cycle was repeated and then cooling was allowed to proceed to room temperature. Examples 30 to 33 produced particles whereas Examples 34 and 35 produced a hard mass which was ground into particles using the mill described in Example 36.

The cooled mixtures were mixed with curing agent which was diaminodiphenylsulphone. The amount of curing agent added was equal to half the weight of the "Epikote" used. The mixtures were then re-heated to a temperature above their $T_{cl}$ and applied to smooth aluminium sheet 300 mm by 100 mm using the Meyer doctoring bar. The sheets were heated in an oven at 230° C. for 30 minutes to cure the compositon and then allowed to cool to ambient temperature (20° C.). Smooth glossy tenacious coherent coatings were obtained.

The above procedure was repeated except that the coated sheets were forced cooled after curing by quenching in cold water at a temperature of 20° C. Again smooth glossy tenacious coherent coatings were obtained.

Both quenched and unquenched coated sheets were subjected to various tests and the results are shown in Table 3 where the suffix "q" denotes the results obtained from the quenched samples.

The chisel test loading shown is the minimum loading needed to cause the aluminium sheet to become visible through the coating.

The T bend result shows the minimum number of bends at which no fracture of the coating is visible to the unaided eye. For example

TABLE 7

| Example | Wt % PBT in mixture | $T_{cl}$ | Film Thickness μm | Chisel Test Loading g | T Bend |
|---|---|---|---|---|---|
| A | 0 | — | 22 | 200 | 2 |
| Aq | 0 | — | 16 | 200 | 2 |
| 30 | 10 | 210 | 20 | 200 | 1 |
| 30 | 10 | 210 | 23 | 100 | 1 |
| 31 | 20 | 208 | 20 | 200 | 1 |
| 31 | 20 | 208 | 20 | 200 | 1 |
| 32 | 30 | 218 | 23 | 200 | 1 |
| 32 | 30 | 218 | 19 | 200 | 0 |
| 33 | 40 | 218 | 27 | 200 | 0 |
| 33 | 40 | 218 | 20 | 300 | 0 |
| 34 | 50 | 220 | 20 | 300 | 0 |
| 34 | 50 | 220 | 17 | 300 | 0 |
| 35 | 75 | 225 | 16 | 300 | 0 |
| 35 | 75 | 225 | 17 | 200 | 0 | a result of 0 (according to ASTM reporting practice) means that the coated sheet can be bent back onto itself with no fracture occuring at the bend. Bending back onto itself is the most severe test because the curvature at the bend is greatest. Results of 1,2 or more mean that the coated has to be bent back onto 1,2 or more thicknesses of coated sheet in order to escape fracture at the bend whereupon the curvature is accordingly reduced by 50%, 33.33% or more respectively and so the test is less severe.

The T-bend results show that compositons containing more that 20 wt % PBT are capable of being back onto themselves which indicates that they are highly suitable for use in forming processes. When such coatings were etched with concentrated (95%) sulphuric acid for 1 to 2 minutes to remove the epoxy material and photographed at a mignification of 5000 using an electron microscope, it could be seen that the particles of PBT where contiguous and coalesced so forming a largely continuous network of PBT which had permeated the epoxy material. Provided that the amount of PBT did not exceed 75 wt %, the epoxy material likewise formed a network which permeated the PBT networks. A qualitative inspection of corrosion tests showed that coatings having interpenetrating networks showed superior corrosion resistance.

The photographs also showed that as the amount of PBT reached 30 wt %, the coalescence between particles increased giving the PBT network a structure resembling a network of filaments. Increasing the amount of PBT further increases the degree of coalescence until at amounts of 75 wt and above, the coating comprises particles of epoxy material dispersed in crystalline polymer.

The various coated sheets were subjected to the rubbing test and all were found to survive over 100 rubs.

EXAMPLE 36 AND COMPARATIVE EXAMPLE B

Use of Alternative Curable Solvent System

A mixture consisting of 20 wt % PBT and 80 wt % "Epikote" 1001 (curable solvent) was made. "Epikote" 1001 is a glycidyl derivative of bisphenol A having the general formula shown earlier where n gives a number average molecular weight of about 900. It has a melting point of from 64° to 76° C. and so is solid at ambient temperatures and accordingly needs to be melted to permit mixing to occur. Mixing was in fact performed at 80° C.

The molten mixture was heated to 260° C. (which is 50° C. above its $T_{cl}$), cooled t 160° C., re-heated to 260° C. and then allowed to cool to ambient temperature (20° C.) producing a solid mass of "Epikote" containing a uniform dispersion of particles which had coalesced to form a network.

The solidified mass was ground into particles using a Retsch ultracentrifugal mill as supplied by F Kurt Retsch of Haan in West Germany and as described in their brochure No 99.785.0002 of September 1987.

The solid ground particles were mixed with curing agent, curing accelerator and volatile carrier liquid to form a curable paste which was convenient to apply to a surface. The curing agent was "Cymel" 303 (hexamethoxymethyl melamine) supplied by CIBA-Geigy, the accelerator was a 1 wt % solution of a blocked dinonyl naphthalene disulphonic acid (Nacure X 49-110) in butoxy ethanol and the carrier liquid was methyl ethyl ketone. The paste contained 6.7 g of the ground particles, 1.07 g of "Cymel" 303, 0.54 g of the accelerator solution and sufficient ketone to give the paste a non-volatile content of 20 wt %.

The paste was applied to a pair of aluminium sheets 300 mm by 100 mm, the sheets were heated to 225° C. for 10 minutes and then one was allowed to cool to ambient temperature (20° C.) and the other was force-cooled by quenching in cold water at a temperature of 20° C. The cooled sheets were subjected to various tests and the results are shown in Table 8.

For Comparative Example B, the above coating procedure was repeated but using "Epikote" 1001 which did not contain PBT. The results are also shown in Table 8.

The paste was applied to an aluminium sheet 300 mm by 100 mm, heated to 255° C. for 10 minutes to cure the "Epikote" and then allowed to cool to ambient temperature (20° C.). A smooth glossy coating was obtained.

EXAMPLE 38

Application of Curable Composition by Spray Coating 40 g of PBT (as used in Examples 5 to 8) were added to 60 g of a curable polyester solvent system which was "Arakote" 3109 which is supplied by CIBA-Geigy. The PBT and resin were heated to 240° C., maintained at that temperature for 30 minutes and then allowed to cool to room temperature whereupon a solid mass of "Arakote" was obtained containing a uniform dispersion of particles of PBT coalesced into a network. The solid mass was ground into particles as in Example 36 and the particles were mixed with a pre-ground blocked isocyanate curing agent which was supplied as B 1530 by Chemische Werke Huls. The amount of curing agent used was 16 wt % of the weight of the "Arakote".

The curable mixture so obtained was then electrostatically sprayed onto aluminium panels 300 mm by 100 mm, heated to 230° C. for 20 minutes in an oven and allowed to cool to ambient temperature (20° C.). Good smooth coherent coatings were obtained.

EXAMPLE 39

Composition Curable at Ambient Temperature 11 g of Nylon 66 was mixed with 25.6 g of glycerol, heated to 225° C. for 10 minutes and then allowed to cool to ambient temperature (20° C.) whereupon a hard paste was obtained. The paste was ground in a pestel and mortar with

TABLE 8

| Example | Wt % PBT in mixture | $T_{cl}$ | Film Thickness μm | Chisel Test Loading g | T Bend | Reverse Impact kg · m |
|---------|---------------------|----------|-------------------|-----------------------|--------|------------------------|
| B | 20 | 208 | 16 | 200 | 1 | 0.46 |
| 36 | 20 | 208 | 18 | 200 | 1 | 0.92 |

Use of an extruder:

Equal weights of PET (as used in Examples 1 to 4) and "Epikote" 1004 (curable solvent) were simultaneously fed to an extruder at a rate of 20 g each per minute. "Epikote" 1004 is a glycidyl derivative of bisphenol A having the general formula shown earlier where n gives a number average molecular weight of about 1400. The extruder was a Werner Pfleiferer ZSK30 twin screw machine operated with a screw speed of 100 rpm. The barrel of the extruder was heated to 270° C. so that the PET dissolved in the "Epikote". On extrusion from the extruder, the mixture was allowed to cool to ambient temperature (20° C.) whereupon the "Epikote" solidified producing a solidified mass of "Epikote" containing uniform dispersion of particles of PET coalesced to form a network. This mass was ground into particles using the technique of Example 36.

The ground particles were mixed with the curing agent, accelerator and carrier liquid used in Example 36 and converted to a paste containing 20 wt % of non-volatile material. The amount of curing agent used was equal to 10 wt % of the "Epikote" present and the amount of accelerator was equal to 0.5 wt % of the curing agent.

a) 3 g of a copolymer consisting of 70 wt % hydroxyethyl acrylate copolymerised with 30 wt % of ethyl acrylate b) 1 g of "Cymel" 1172 which has the structure shown below and c) 1 g of para toluene sulphonic acid.

The resultant mixed paste was applied to a glass and an aluminium panel each 300 mm by 100 mm using the Meyer bar. The panels were then allowed to stand at room temperature for 10 hours whereupon both acquired smooth glossy tenacious coherent cured coatings.

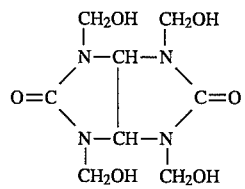

EXAMPLE 40

Making and Use of Curable Composition Containing Polycarbonate

Amorphous bisphenol A polycarbonate available as "Sinvet" 251 from ENI Chem was mixed equal volumes of a curable solvent system which was "Epikote" 880 and of an auxiliary solvent which was dimethyl phthalate to produce a mixture consisting of 40 wt % polycarbonate and 60 wt % of the solvents. The mixture was heated to 150° C. for two minutes and allowed to cool to ambient temperature (20° C.). A portion of the cooled mixture was re-heated to 150° C. and again allowed to cool to ambient temperature whereupon particles were obtained which comprised amorphous zones containing entrapped solvent and had a particle size of from 2 to 10 µm.

The particles could be mixed with diaminodiphenylsulphone curing agent and applied to aluminium sheets as in Examples 1 to 4 to produce glossy smooth tenacious coherent coatings.

We claim:

1. A curable composition comprising a liquid selected from the group consisting of organic solvent and water and solid particles of a crystallizable polymer, selected from the group consisting of poly(ethylene terephthalate), poly(ethylene terephthalate/isophthalate), and poly(butylene terephthalate) dispersed in said liquid, said particles comprising amorphous zones containing an entrapped curable epoxy resin, whereby adjacent zones may be linked together by curing of the entrapped epoxy resin, said coating composition also comprising a curing agent for said curable epoxy resin.

2. A coating composition according to claim 1 wherein said particles have a maximum diameter of less than 500 µm.

3. A coating composition according to claim 1 wherein the weight ratio of said crystallizable polymer to said curable epoxy resin is from 1:0.1 to 1:19.

4. A coating composition according to claim 3 wherein said weight ratio is from 1:0.25 to 1:4 whereby the composition is capable, when cured, of forming a network of cohering portions of said crystallizable polymer interpenetrated by a network of cohering portions of cured curable epoxy resin.

5. A coating composition according to claim 1 wherein said crystallizable polymer is selected from the group consisting of poly(ethylene terephthalate), poly(butylene terephthalate), mixtures of these and their copolymers.

6. A coating composition according to claim 1 wherein said curable epoxy resin is a non-permanent solvent system.

* * * * *

UNITED STATES PATENT AND TRADEMARK OFFICE
CERTIFICATE OF CORRECTION

PATENT NO.   : 5,464,884

DATED        : November 7, 1996

INVENTOR(S)  : NIELD et al

It is certified that error appears in the above-identified patent and that said Letters Patent is hereby corrected as shown below:

On the Title Page, item

--[73]   Assignee:   Imperial Chemical Industries, PLC
                                      London, England--

Signed and Sealed this

Twenty-first Day of May, 1996

Attest:

BRUCE LEHMAN

Attesting Officer          Commissioner of Patents and Trademarks